(12) United States Patent
Saxena et al.

(10) Patent No.: US 7,359,966 B2
(45) Date of Patent: Apr. 15, 2008

(54) METHODS AND SYSTEMS FOR PASSIVE INFORMATION DISCOVERY USING LOMB PERIODOGRAM PROCESSING

(75) Inventors: Tushar Saxena, Lexington, MA (US); David B. Cousins, Barrington, RI (US); Craig Partridge, East Lansing, MI (US); W. Timothy Strayer, West Newton, MA (US)

(73) Assignee: BBN Technologies Corp., Cambridge, MA (US)

( * ) Notice: Subject to any disclaimer, the term of this patent is extended or adjusted under 35 U.S.C. 154(b) by 1016 days.

(21) Appl. No.: 10/243,489

(22) Filed: Sep. 13, 2002

(65) Prior Publication Data

US 2008/0046549 A1 Feb. 21, 2008

Related U.S. Application Data

(63) Continuation-in-part of application No. 10/167,620, filed on Oct. 19, 2001, now Pat. No. 7,170,860.

(60) Provisional application No. 60/355,573, filed on Feb. 5, 2002, provisional application No. 60/329,726, filed on Oct. 16, 2001.

(51) Int. Cl.
*G06F 15/173* (2006.01)

(52) U.S. Cl. ................. 709/224; 713/168; 370/252

(58) Field of Classification Search ........... 709/224; 713/160; 370/252
See application file for complete search history.

(56) References Cited

U.S. PATENT DOCUMENTS

| 5,596,719 | A | 1/1997 | Ramakrishnan et al. |
| 5,838,919 | A | 11/1998 | Schwaller et al. |
| 5,881,237 | A | 3/1999 | Schwaller et al. |
| 6,453,345 | B2 | 9/2002 | Trcka et al. |
| 6,546,017 | B1* | 4/2003 | Khaunte ............ 370/412 |
| 6,700,895 | B1* | 3/2004 | Kroll ............ 370/412 |

(Continued)

OTHER PUBLICATIONS

Robert Tagliaferri et al., Hybrid Neural Networks for Frequency Estimation of Unevenly Sampled Data, IEEE 1999.*

(Continued)

*Primary Examiner*—Abdullahi Salad
(74) *Attorney, Agent, or Firm*—Ropes & Gray LLP (57) ABSTRACT

A system processes communication signals in a network [100, 200]. The system may obtain time of arrival information for chunks of data in the network and construct a signal [410, 420] to represent the time of arrival information. The signal may consist of data that is non-uniformly spaced. The system may process the signal using a Lomb technique to obtain periodicity information [600, 800] about the signal.

28 Claims, 9 Drawing Sheets

U.S. PATENT DOCUMENTS

| | | | |
|---|---|---|---|
| 6,718,395 B1 * | 4/2004 | Ziegler | 709/248 |
| 6,958,977 B1 * | 10/2005 | Mitrani et al. | 370/252 |
| 7,089,428 B2 | 8/2006 | Farley et al. | |
| 2002/0080967 A1 | 6/2002 | Abdo et al. | |
| 2002/0112060 A1 | 8/2002 | Kato | |
| 2002/0150102 A1 * | 10/2002 | Janko et al. | 370/392 |
| 2003/0028662 A1 | 2/2003 | Rowley et al. | |
| 2003/0097439 A1 * | 5/2003 | Strayer et al. | 709/224 |
| 2003/0145110 A1 | 7/2003 | Ohnishi et al. | |
| 2003/0182431 A1 | 9/2003 | Sturniolo et al. | |
| 2005/0198504 A1 * | 9/2005 | Smith | 713/168 |
| 2005/0286414 A1 | 12/2005 | Young et al. | |

OTHER PUBLICATIONS

Patrice Abry, Richard Baraniuk, Patrick Flandrin, Rudolf Riedi, and Darryl Veitch, "Multiscale Nature of Network Traffic," IEEE Signal Processing Magazine, May 2002, pp. 28-46.

Olivier Cappé, Eric Moulines, Jean-Christophe Pesquet, Athina Petropulu, and Xueshi Yang, "Long-Range Dependence and Heavy-Tail Modeling for Teletraffic Data," IEEE Signal Processing Magazine, May 2002, pp. 14-27.

* cited by examiner

METHODS AND SYSTEMS FOR PASSIVE INFORMATION DISCOVERY USING LOMB PERIODOGRAM PROCESSING

RELATED APPLICATION

This application claims the benefit of priority under 35 U.S.C. § 119(e) of a provisional application Ser. No. 60/329,726, filed Oct. 16, 2001, and provisional application Ser. No. 60/355,573, filed Feb. 5, 2002, the entire contents of both of which are incorporated herein by reference.

This application is also a continuation-in-part (CIP) under 37 C.F.R. § 1.53(b) of application Ser. No. 10/167,620, filed Oct. 19, 2001, now U.S. Pat. No. 7,170,860 the entire contents of which are incorporated herein by reference.

GOVERNMENT INTEREST

The invention described herein was made with government support. The U.S. Government may have certain rights in the invention, as provided by the terms of contract No. MDA972-01-C-0080, awarded by the Defense Advanced Research Projects Agency (DARPA).

BACKGROUND OF THE INVENTION

1. Field of the Invention

The present invention relates generally to communication networks, and more specifically, to the monitoring of data transmitted over such networks.

2. Description of Related Art

Communication networks typically include a number of interconnected communication devices. Connections among the devices in some communication networks are accomplished through physical wires or optical links. Such networks may be referred to as "wired" networks. Connections among the devices in other communication networks are accomplished through radio, infrared, or other wireless links. Such networks may be referred to as "wireless" networks.

Communication messages (e.g., data packets) sent across communication networks may be intercepted. Intercepted messages may yield valuable information, and the process of intercepting and analyzing messages may be referred to as "traffic analysis." In general, traffic analysis seeks to understand something about the message traffic by passively observing the traffic and analyzing that traffic to extract information. To guard against unwanted traffic analysis, messages are typically encrypted. For example, both the content and the destination of a message could be obscured through encryption.

In some situations, however, it may still be desirable to monitor traffic flow over communication networks. Accordingly, there is a need to monitor traffic flow even when identifying information associated with the messages is encrypted.

SUMMARY OF THE INVENTION

Methods and systems consistent with the present invention address this and other needs by analyzing non-uniformly spaced, time of arrival data in a network to obtain periodicity information about data flows in the network. Characteristics of the data flows may be obtained by processing the periodicity information.

In accordance with one purpose of the invention as embodied and broadly described herein, a method of analyzing communication from nodes in a network is provided. The method may include obtaining time of arrival information for chunks of data in the network and constructing a signal to represent the time of arrival information. The signal may consist of data that is non-uniformly spaced. The signal may be processed to obtain periodicity information about the signal.

In another implementation consistent with the present invention, a method of processing communication signals from nodes in a network is provided. The method may include obtaining time of arrival information for chunks of data in the network and constructing a signal to represent the time of arrival information. The signal may include data that is non-uniformly spaced. The signal may be processed using a Lomb technique to obtain periodicity information about the signal.

In a further implementation consistent with the present invention, a method of processing communication signals is provided. The method may include generating a signal containing non-uniformly spaced data that represent times of arrival of chunks of information in a network. The signal may be processed using a Lomb technique to obtain power of the signal versus time or frequency.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Data encryption may hide the contents of packets (i.e., discrete units of data), but it does not obscure basic protocol mechanisms and dynamics. Some examples of these basic mechanisms may include the packet's source, destination, and the interpacket gaps caused by certain applications.

Methods and systems consistent with the principles of the invention use non-uniformly spaced, time of arrival data in a network to obtain periodicity information about data flows in the network. Characteristics of the data flows may be obtained by processing the periodicity information.

Exemplary Wired Network

Figure 1:
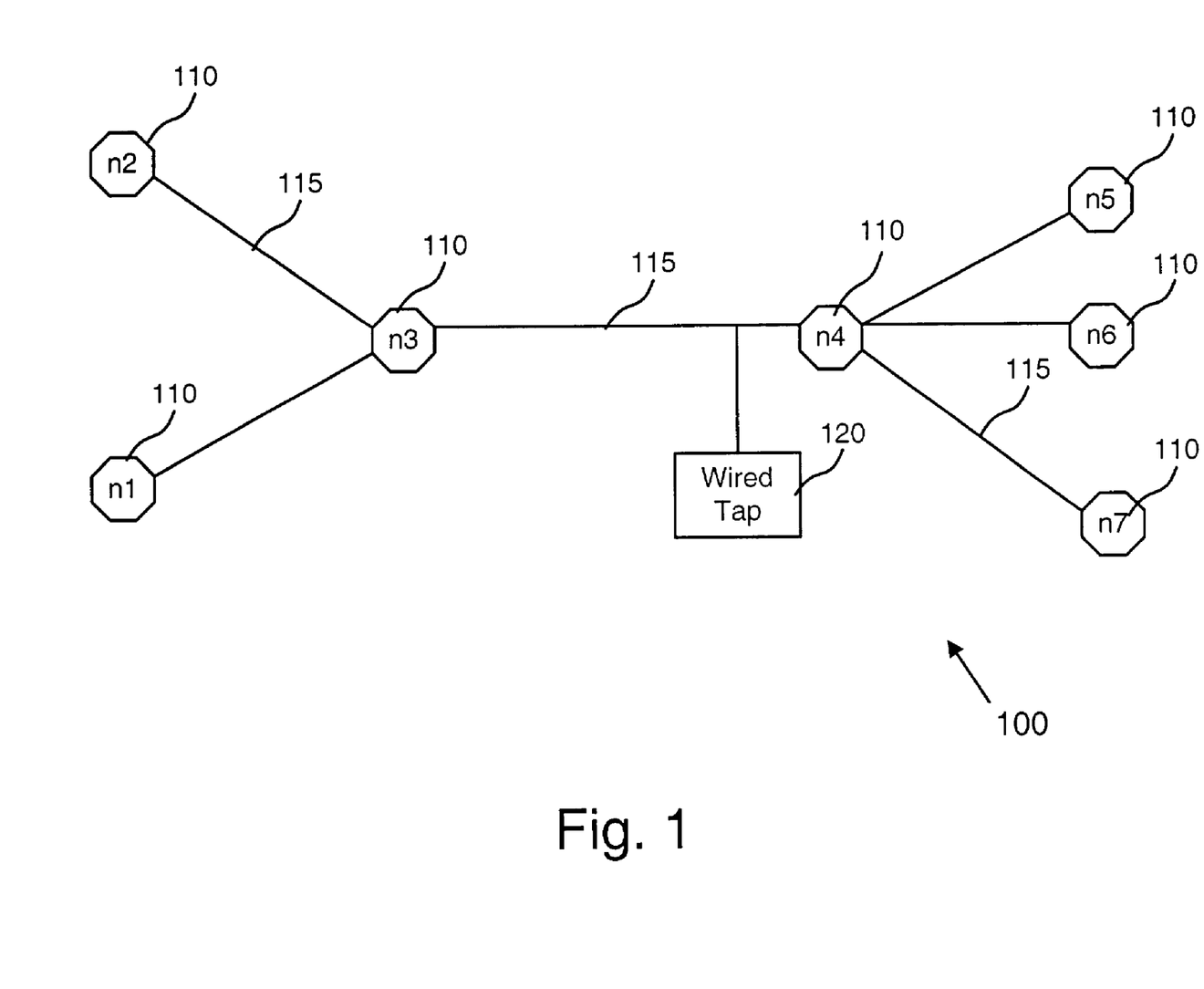
FIG. 1 is a diagram illustrating an exemplary wired network and tap according to an implementation consistent with the present invention.

FIG. 1 is a diagram illustrating an exemplary wired network 100 according to an implementation consistent with the present invention. The wired network 100 may include a number of network nodes 110 connected by a number of network links 115. The wired network 100 may also include one or more network taps 120. Although seven nodes 110 and one tap 120 are shown connected in a particular configuration, this is purely exemplary. Wired network 100 may include any number and configuration of nodes 110, links 115, and taps 120.

Network nodes 110 may be configured to send and receive information according to a communication protocol, such as TCP/IP. Although not specifically shown, some nodes 110 may be configured to provide a route for information to a specified destination. Other nodes 110 may be configured to send the information according to a previously-determined route. The network nodes 110 may communicate via discrete "chunks" of data that are transmitted by "senders" 110. A chunk may be individually detectable or distinguishable (i.e., a listening device, such as tap 120, may determine when a chunk starts and ends). A chunk of data need not exactly correspond to a packet of data. A chunk may represent part of a packet (e.g., a fragment or an ATM cell of an AAL5 PDU), or multiple packets (e.g., two packets concatenated).

Chunks of data may be transmitted by "senders" 110. A sender 110 may be the most recent node 110 to transmit a particular chunk (e.g., node n3 in FIG. 1, if the tap 120 intercepts a chunk transmitted to node n4). The sender 110 is not necessarily the node 110 that originated the chunk.

Network links 115 may include electronic links (e.g., wires or coaxial cables) and optical links (e.g., fiber optic cables). These links 115 may provide a connection between two nodes 110 (e.g., nodes n1 and n3). It may be possible to physically tap into these links 115 to observe the information carried on them.

Network tap 120 is a device that may intercept chunk transmissions on the network 100. The tap 120 may include a physical connection to a corresponding link 115 and circuitry to detect chunks of data on the link 115. The tap 120 may intercept chunks at a physical layer, a link layer, a network layer, or at higher layers of the network 100 being monitored. The layer at which interceptions occur is within the abilities of those skilled in the art, and may be chosen based on knowledge of, and access to, the network links 115. The tap 120 may include, for example, a transceiver for sensing the chunks of data and may also include other circuitry (e.g., clock circuitry) for determining times of arrival and duration of the chunks. The tap 120 may include a processor for computing any other information associated with the chunks, such as information contained within a header of the chunk of data (e.g., identity of a sending node and/or receiving node).

Tap 120 may observe traffic on the link 115 between nodes n3 and n4. Tap 120 may record information about all the chunks that it observes in a "tracefile." The tracefile may contain a minimum amount of information for each observed chunk. For example, the information may include the time the chunk was seen and the identity of the sender 110 of the chunk. The identity of the sender 110 may include, for example, the IP address of an IPsec gateway, the upstream or downstream transmitter on the point-to-point link 115, or "the same sender 110 as the one that also sent these other chunks." If available, the tracefile may also include additional information about the length or duration of the chunk, the observed direction of flow, the destination node 110, or any insight into the contents of the chunk. Other information that may be available is the location of the tap 120 along the link 115 relative to the nodes 110 at either end of the link 115.

Tap 120 may not capture all traffic on the link 115. For example, tap 120 may occasionally make an error and mistakenly believe it has seen a chunk when no chunk was sent (e.g., due to bit errors on wired network 100). If transmissions are missed, false transmissions are detected, or if a sender 110 is misclassified, these events may be viewed as adding noise to the signals generated by the tap 120. Other sources of noise in the signal generated by the tap 120 may include interference from other signals (e.g., packets belonging to another flow, or jitter in timing due to sharing of a bottleneck among multiple flows).

Tap 120 may listen passively and may not participate in the monitored network 100 at the MAC (or higher) layers. In some cases, for example with 802.3 LANs, it is possible for the tap 120 to snoop at the MAC layer and extract some information about higher layer protocols. In the case of SONET networks, however, little or no information may be available about the MAC or higher layer protocols.

Although a single tap 120 is shown in FIG. 1, wired network 100 may contain many taps 120, which may be interconnected. Taps 120 may work independently using purely local information. Distributed algorithms may allow sharing of information among taps 120. In such a case, taps 120 may have a globally synchronized clock, or other means, that allows information from multiple taps 120 to be combined. A clock resolution of the taps 120 may be finer than the data sampling resolution of the taps 120, so that information about transmissions (e.g., the start time, duration, inter-transmission gap, and even the presence of short transmissions) is not missed.

A tap 120 (or a network of taps 120) should store the transmissions that it detects for a sufficient amount of time. For example, the round-trip time of a transport layer flow cannot be determined if the history that may be stored at tap 120 is less than one roundtrip time. The total volume of data that is stored depends on the capacity of the link 115 and the maximum round-trip time of flows seen on the link 115. Taps 120 may assign a unique identifier to each sender 110, for example, based on the address of the IPsec gateway. Taps 120 in the network 100 may assign the same unique identifier to any given sender 110.

Exemplary Wireless Network

Figure 2:
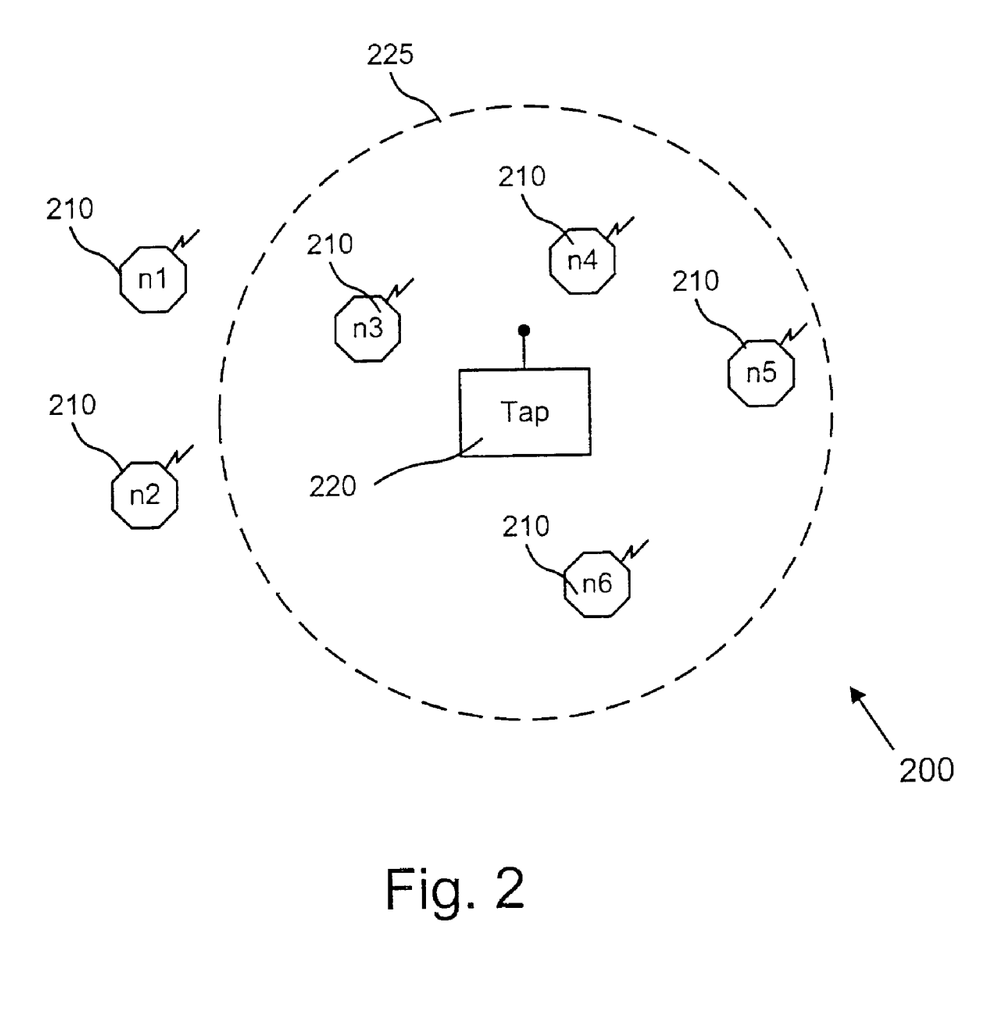
FIG. 2 is a diagram illustrating an exemplary wireless network and tap according to an implementation consistent with the present invention.

FIG. 2 is a diagram illustrating an exemplary wireless network 200 according to an implementation consistent with the present invention. The wireless network 200 may include a number of wireless nodes 210 and one or more wireless taps 220. The wireless nodes 210 may communicate via wireless transmission, either point-to-point or, more typically, broadcast transmission. The wireless tap 220 may have an associated area 225 in which it may be able to intercept wireless transmissions.

Although six nodes 210 and one tap 220 are shown in FIG. 2, this is purely exemplary. Wireless network 200 may include any number and configuration of nodes 210 and taps 220. The behavior and operation of the wireless nodes 210 and the wireless tap 220, where similar to the network nodes 110 and tap 120 described above, will not be repeated.

Wireless nodes 210 may communicate via chunks of data that are transmitted by senders 210. Senders 210 may transmit using various types of wireless physical layers, such as terrestrial RF, satellite bands, and free space optical. Nodes 210 may be, for example, radio routers or client radios in the wireless network 200.

Wireless tap 220 is a device that may intercept wireless transmissions on the network 200. Unlike tap 120, which may detect chunks of data only on a certain link 115, wireless tap 220 may observe some (potentially very large) fraction of the wireless spectrum, and thus may see transmissions from a wide range of senders 210. As shown in FIG. 2, tap 220 may have a limited effective reception range. Dashed line 225 indicates an effective reception area through which tap 220 may receive communications from the nodes. As shown, nodes n1 and n2 are out of the effective reception area and will not be monitored by tap 220. Nodes n3-n6, which are within the range 225, may be monitored by tap 220. The tap 220 may include, for example, a transceiver for sensing the chunks of data and may also include other circuitry (e.g., clock circuitry) for determining times of arrival and duration of the chunks. The tap 220 may include a processor for computing any other information associated with the chunks, such as information contained within physical characteristics of the chunk of data (e.g., the identity of a sending or receiving node).

Wireless tap 220 also may record information about all the chunks that it observes in a tracefile. The tracefile may contain a minimum amount of information for each observed chunk. For example, the information may include the time the chunk was seen and the identity of the sender 210 of the chunk. The identity of the sender 210 may include, for example, an RF signature, the location of a radio transmitter, or "the same sender 210 as the one that also sent these other chunks." If available, the tracefile may also include additional information about the length or duration of the chunk, the destination node 210, or any insight into the contents of the chunk. Other information that may be available is the geographic location of the tap 220, as determined by, for example, a global positioning system (GPS) receiver.

Tap 220 may not capture all traffic within its range 225. For example, reception on the wireless network 200 may be variable due to environment, noise, transmission power, or jamming such that a tap is unable to observe some transmissions. Furthermore, tap 220 may occasionally make an error and mistakenly believe it has seen a chunk when no chunk was sent (again due to noise on a wireless network). If transmissions are missed, false transmissions are detected, or if a sender 210 is misclassified, these events may be viewed as adding noise to the signals generated by the tap 220. Other sources of noise in the signal generated by the tap 220 may include interference from other signals (e.g., packets belonging to another flow, or jitter in timing due to sharing of a bottleneck among multiple flows).

Tap 220 may listen passively and may not participate in the monitored network 200 at the MAC (or higher) layers. In some cases, for example with 802.11b LANs, it is possible for the tap 220 to snoop at the MAC layer and extract some information about higher layer protocols. In the case of tactical ad hoc networks, however, little or no information may be available about the MAC or higher layer protocols.

Although a single tap 220 is shown in FIG. 2, wireless network 200 may contain many taps 220, which may be interconnected. In general, the number of taps 220 placed in network 200 is determined by the desired coverage level of network 200. Taps 220 may work independently using purely local information. Distributed algorithms may allow sharing of information among taps 220. In such a case, taps 220 may have a globally synchronized clock that allows information from multiple taps 220 to be combined. A clock resolution of the taps 220 may be finer than the data sampling resolution of the taps 220, so that information about transmissions (e.g., the start time, duration, inter-transmission gap, and even the presence of short transmissions) is not missed.

In the presence of mobile nodes 210 (for example, in ad hoc wireless networks or Mobile IP), taps 220 may, but need not, be mobile. Taps 220 may be placed randomly over a specified geographic area, or in a pattern. Alternately, taps 220 may be placed near respective senders 210. Senders 210 can move into or out of range of one or more taps 220. Senders 210 typically may dwell in the range of one or more taps 220 long enough for transmissions to be observed, and the sources identified and recorded. Taps 220 may assign a unique identifier to each sender 210, for example, based on their RF signature. Taps 220 in the network 200 may assign the same unique identifier to any given sender 210.

Exemplary System-Level Processing

Figure 3:
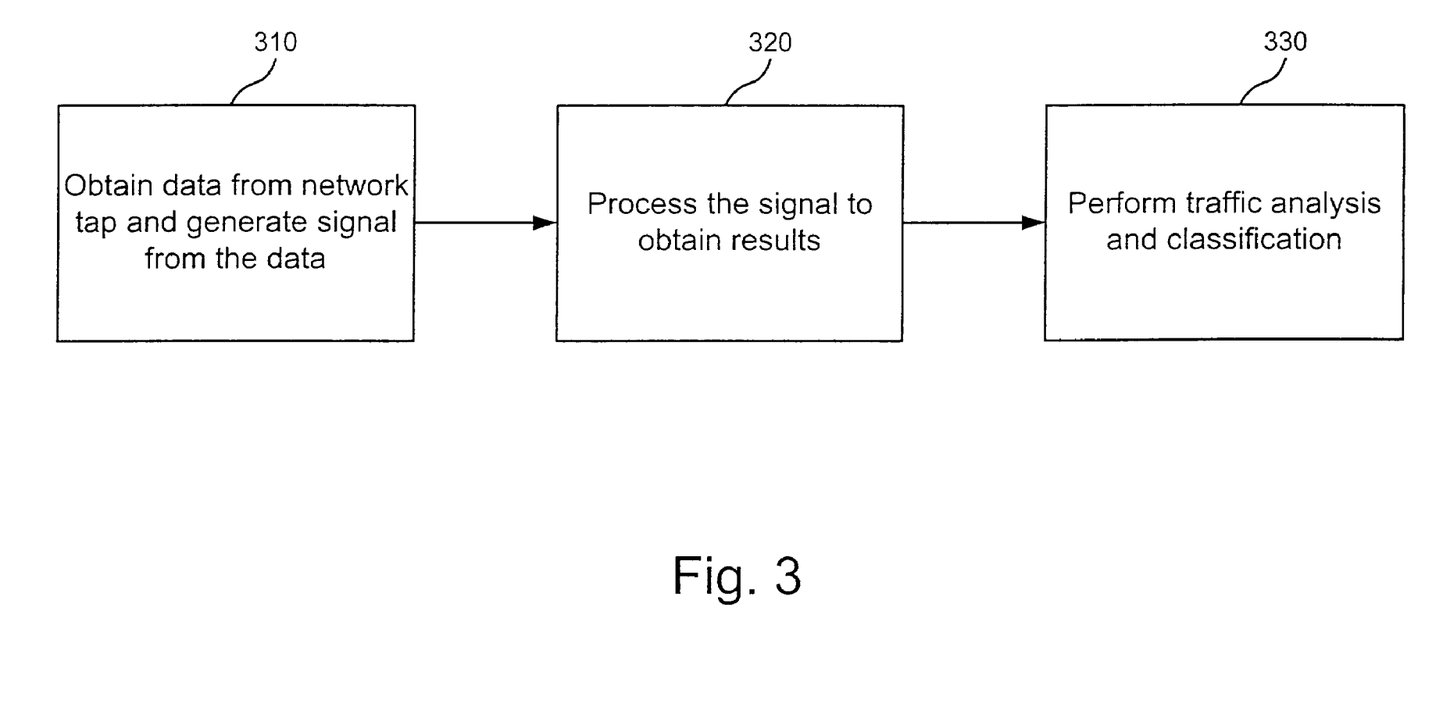
FIG. 3 is an exemplary diagram of traffic flow analysis and classification processing in the networks of FIGS. 1 and 2.

FIG. 3 is an exemplary diagram of traffic flow analysis and classification processing in networks 100 and 200. Processing may begin with a tap 120/220 obtaining data from its respective network 100/200. The tap 120/220 may also generate a signal from the data that it obtains [act 310].

Either the tap 120/220 or an associated (possibly central) processor (not shown) may perform processing on the signal produced by the tap 120/220 to produce results [act 320]. Such signal processing may produce identifiable signal traffic features, and may be computationally intensive. Those skilled in the art will appreciate, based on processing and networking requirements, whether to perform the signal processing at each tap 120/220 or other location(s).

The signal processing results may be further processed to analyze and classify the traffic on the network 100/200 [act 330]. Again, such traffic analysis processing may be performed by the tap 120/220 or another processor. Acts 310-330 may be broadly characterized as "signal generation," "signal processing," and "traffic analysis," respectively. These acts will be described in greater detail for certain implementations below.

Exemplary Signal Generation

Once a tap 120/220 has generated a tracefile of tapped data, a signal may be generated (e.g., as in act 310) from the tracefile for further traffic analysis. A tracefile may represent discrete events, namely a sequence of events associated with different times. The tracefile may include other information (e.g., sender or recipient information) associated with the events.

A general approach to producing a signal representing time of arrival of chunks is to pick an appropriate time quantization, to bin time into increments at that quantization, and to place a marker in the bins where a chunk was detected. At least three schemes may be used to represent the time of arrival of a chunk: 1) non-uniform time sampling (e.g., FIG. 4A), 2) uniform impulse sampling (e.g., FIG. 4B), and 3) uniform pulse sampling (e.g., FIG. 4C).

Figure 4A:
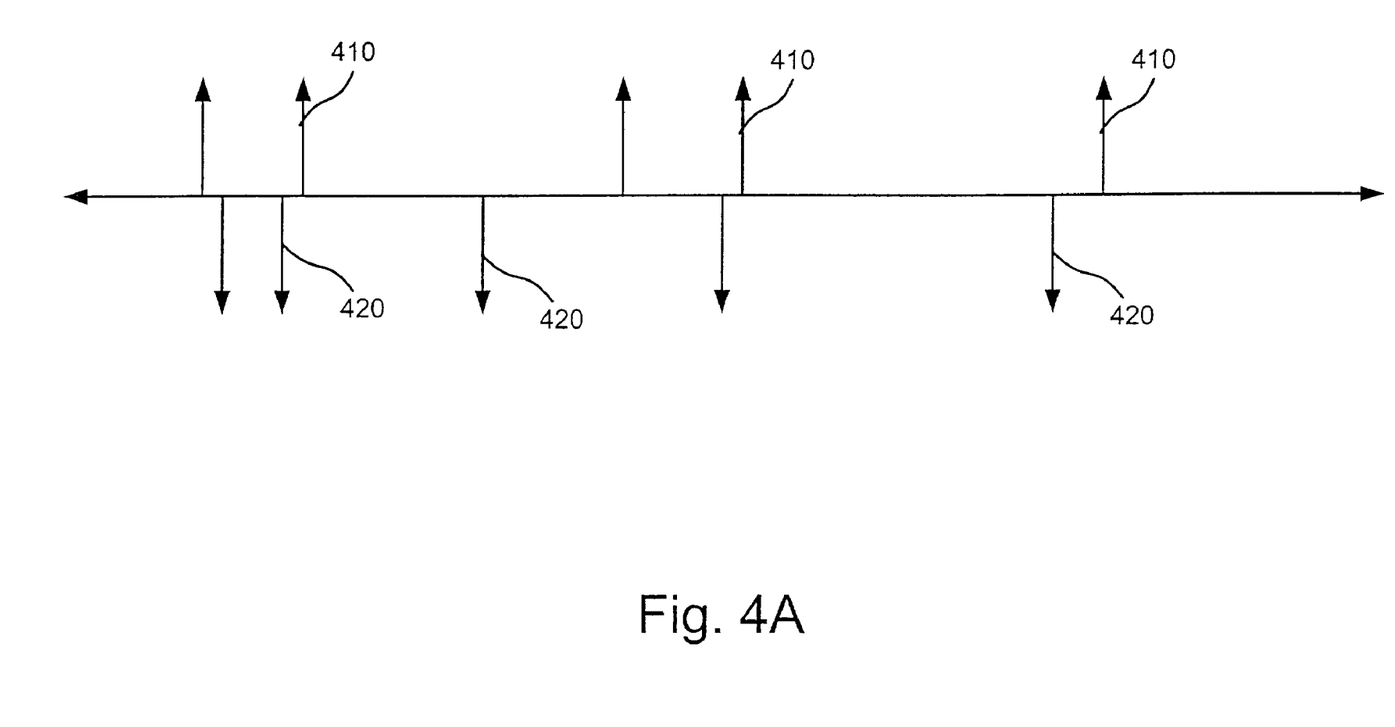
FIGS. 4A, 4B, and 4C are exemplary signals that may be generated from tracefiles according to an implementation consistent with the present invention.

Under the first of the three schemes, a non-uniform signal may be represented as a non-uniformly-spaced sequence of impulses. Each impulse may indicate the leading edge of the discrete events in the tap's tracefile, where time is quantized to the desired resolution. Only a limited number of signal processing algorithms, however, have been derived for non-uniform sampled data. One example of such a signal processing algorithm is a Lomb Periodogram, which can process non-uniformly sampled data sets.

FIG. 4A illustrates the first scheme, which represents tracefile data as a non-uniformly sampled series of (possibly unit) impulses 410/420. In such a non-uniform signal, the discrete events of the tracefile may quantized into a time sequence of, for example, impulses. Impulses 410 may be encoded (e.g., as +1) when a chunk is received from a first node. Impulses 420 may be encoded (e.g., as −1) when a chunk is received from a second node that is different than the first node.

Other encoding schemes will be apparent to those skilled in the art, depending on the amount of available information in the tracefiles and the ability of later signal processing schemes to use the available information. Exemplary schemes may include binary, single value encoding (e.g., amplitude proportional to value), multiple value encoding, pulse length encoding, and complex amplitude encoding, or combinations thereof. The above methods of generating signals from data collected by taps 120/220 are exemplary, and should not limit other methods of generating signals which may be implemented by those skilled in the art without undue experimentation.

Figure 4B:
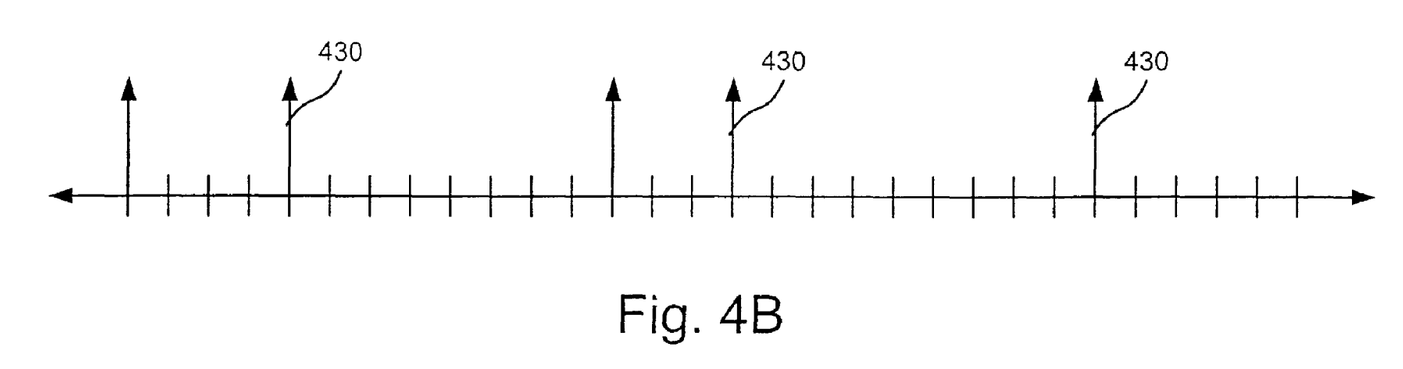

FIG. 4B illustrates the second scheme, which represents tracefile data as a uniformly sampled series of impulses 430. Such uniform sampling of the data implies a sample time quantization period (shown as tick marks in FIG. 4B). It is known that for accurate signal reconstruction, the data should be sampled such that the sampling frequency is greater than twice the highest frequency content of the data (i.e., the Nyquist rate). The tracefiles, however, contain discrete events (e.g., a chunk was seen at a particular time). So for most forms of processing, the discrete events of the tracefile are quantized into a time sequence of either impulses (e.g., FIG. 4B) or pulses (e.g., FIG. 4C).

Data may be encoded in each time increment as if it is a binary encoding: 1 (i.e., impulse 430) if a chunk is detected and 0 if not. More complex information, however, may be encoded in a time increment if such additional information is present in the tracefile. For example, if the duration of each chunk is known, then all the time increments during which a chunk was present may be set to 1, with 0's only during times when no chunks were visible. Such duration encoding would result in, for example, trains of adjacent impulses 430 (not shown).

Further, multiple chunks may be in transit at the same time. One approach to keep simultaneous data from being obscured may be to jitter the time of the conflicting events into empty adjacent sample times. Another approach to this issue may be to generate distinct tracefiles for each sender. Multiple tracefiles may refine later traffic flow analysis, by focusing on traffic from each sender separately. In another approach, rather than creating different encodings for different sources, the presence of multiple chunks may be encoded by placing a count of the number of live chunks in each increment. So there may be 3 chunks in one increment, 5 in the next, and so forth, where the number of chunks is encoded as the strength of the impulse 430.

Figure 4C:
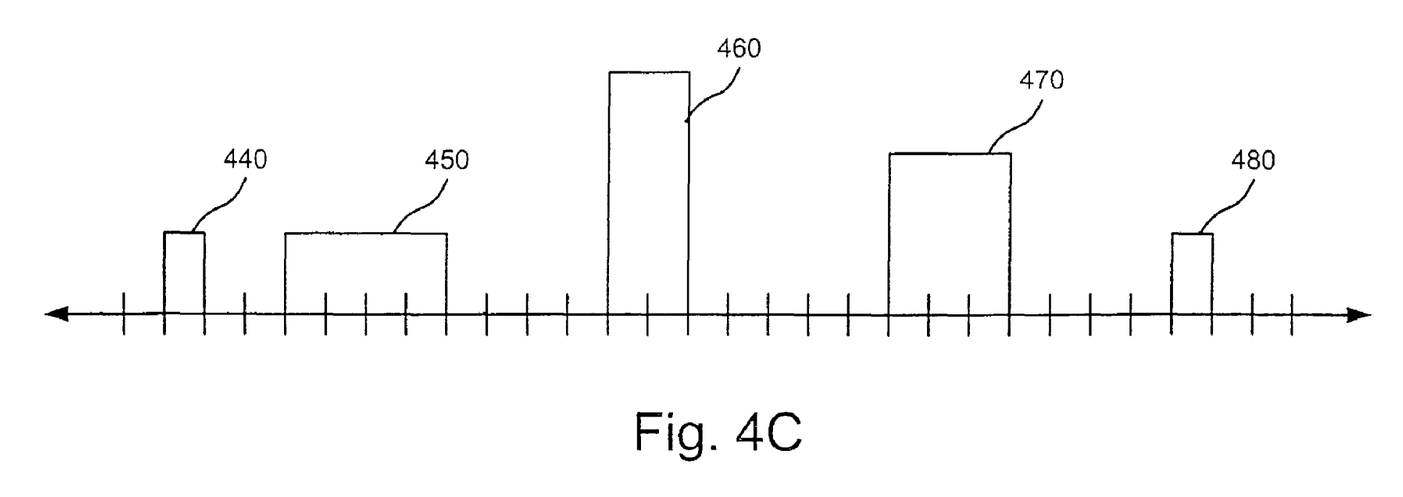

FIG. 4C illustrates the third scheme, which represents tracefile data as a uniformly sampled series of pulses 440-480. If information about the duration of chunks is not present in the tracefile (or will not be encoded), the arrival of chunks may be encoded by a pulse of unit height and length (e.g., pulses 440 and 480). If the duration of each chunk is available, the time increments during which a chunk was present may be set to 1, with 0's only during times when no chunks were visible (e.g., pulses 450-470 and the spaces among them).

Similarly, if multiple chunks are in transit at the same time, the associated signal may be encoded as a series of weighted pulses whose pulse height encodes the number of chunks present at that time (e.g., pulses 460 and 470). Thus, pulses 440-480 may encode three pieces of information present in the tracefile: the start time of a chunk, the duration of the chunk, and how many chunks are present at a particular time.

Further, the pulses 440-480 need not be rectangular as shown in FIG. 4C. Pulses may be, for example, Gaussian pulses whose width and/or height may be proportional to as many as two different pieces of information.

Exemplary Lomb Periodogram Signal Processing

Discrete Fourier Transform (DFT)-based periodograms require uniform samples, (e.g., FIGS. 4B, 4C, as discussed above) which may in turn require resampling of the original tracefile. Such re-sampling of a typically non-uniform tracefile may lead to loss of information. Lomb periodograms may overcome this obstacle.

Packet arrivals in computer networks' 100/200 are inherently unevenly spaced, resulting in a natural signal encoding that is non-uniformly sampled (e.g., FIG. 4A, as discussed above). Lomb, Scargle, Barning, and Vanicek developed a spectral analysis technique (hereinafter "Lomb" technique or method) that is specifically designed for data that is non-uniformly sampled. The Lomb method computes a periodogram by evaluating data only at the times for which a measurement is available. Although the Lomb method is computationally more complex (O(NlogN)), this evaluation property makes it an especially appropriate Power Spectral Density (PSD) estimator for examining event arrival traces. Also, because only the event arrivals need to be stored in the time series (i.e., no resampling is required), the Lomb method has an added advantage that the input data is sparse and consumes less storage or memory. The Lomb method offers all the attractions of DFT-based periodograms, such as confidence intervals for various peaks, with the added advantage of a more precise power density computations for non-uniform time series.

The Lomb method may estimate a power spectrum for N points of data at any arbitrary angular frequencies. The power density $P_N$ at a frequency k or angular frequency $\omega$ ($=2\pi k$) is:

$$P_N(\omega) \equiv \frac{1}{2\sigma^2} \left\{ \frac{\left[\sum_n (h_n - \bar{h}) \cos \omega(t_n - \tau)\right]^2}{\sum_n \cos^2 \omega(t_n - \tau)} + \frac{\left[\sum_n (h_n - \bar{h}) \sin \omega(t_n - \tau)\right]^2}{\sum_n \sin^2 \omega(t_n - \tau)} \right\}$$

where $$\bar{h} \equiv \frac{1}{N} \sum_{n=0}^{N-1} h_n$$

$$\sigma^2 \equiv \frac{1}{N-1} \sum_{n=0}^{N-1} (h_n - \bar{h})^2$$

$$\tau = \frac{1}{2\omega} \tan^{-1} \left( \frac{\sum_n \sin 2\omega t_n}{\sum_n \cos 2\omega t_n} \right).$$

Also, $h_n$ (n=0, ..., (N−1)) are the N samples of the signal at times $t_n$, which may be unevenly spaced. A Lomb periodogram is equivalent to least-squares fitting a sinusoid of frequency ω to the available, unevenly spaced, data. If times $t_n$ are evenly spaced (i.e., the signal is uniformly sampled), the Lomb periodogram reduces to the standard squared Fourier transform.

As an example, samples may be available at times $t_n$ of 50.000411, 50.003443, ..., 50.032611 seconds, from nodes n1, n2, ..., n1. These samples maybe encoded with corresponding sample values $h_n$ of −1, +1, ..., −1 (see, for example, FIG. 4A as discussed above).

When analyzing network traces, sometimes it may be more convenient to work with time periods rather than angular frequencies, as will be shown below, where the Lomb method is illustrated with specific networks. The power density $P_N$ at any time period X may be readily computed, because it is equal to P(2π/X).

Exemplary Simulation Results

Figure 5:
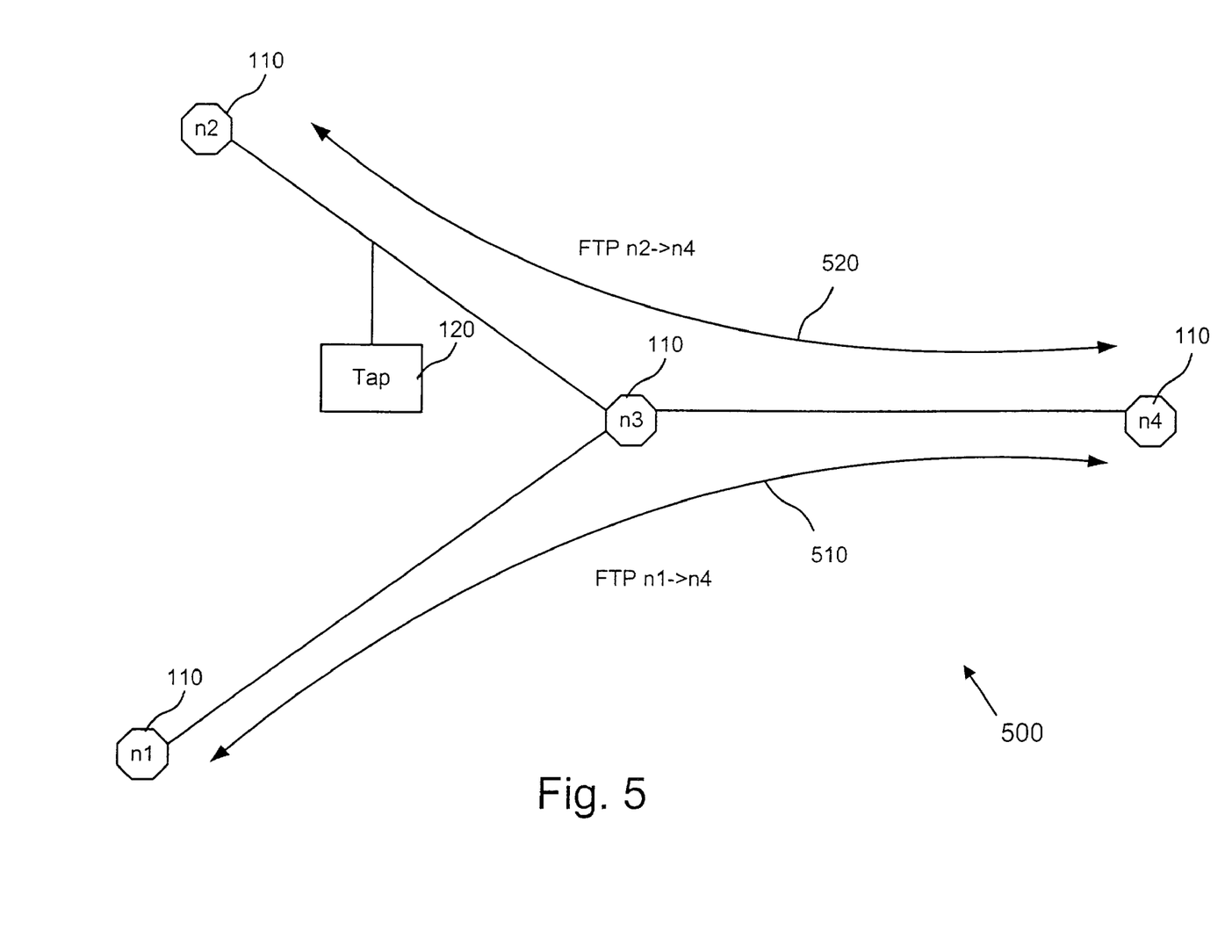
FIG. 5 illustrates a simulated wired network with which Lomb periodogram simulations were performed.

Wired Network:

FIG. 5 illustrates a simulated wired network 500 that generated a signal on which the Lomb periodogram processing described above was performed. The simulated wired network 500 included four nodes 110 (i.e., n1-n4). Two data flows 510 and 520 were present in the simulated network 500. The first data flow 510 was an FTP (file transfer protocol) flow from node n1 to node n4 by way of node n3. The second data flow 520 was another FTP flow from node n2 to node n4, also by way of node n3. The simulated tap 120 may sense the transmissions on the wire between nodes n2 and n3 as the transmissions pass through (or near) the tap. The tap 120 also may identify the direction of the transmissions, and may encode them with opposite sign values (e.g., −1 or +1).

The simulation was run in a network simulation program for 300 seconds. The "ground truth" statistics for the first FTP flow 510 between nodes n1 and n4 were as follows: 27,451 packets traveled from node n1 to n4, and 27,432 ACKs traveled from node n4 back to n1. The resulting average transmission interval for nodes n1 and n4 was 10.93 ms. The estimated round trip time (rtt) for the first FTP flow 510 was 218.67 ms. The statistics for the second FTP flow 520 between nodes n2 and n4 were as follows: 28,829 packets traveled from node n2 to n4, and 28,809 ACKs traveled from node n4 back to n2. The resulting average transmission interval for nodes n2 and n4 was 10.41 ms. The estimated round trip time (rtt) for the second FTP flow 520 was 208 ms.

Figure 6:
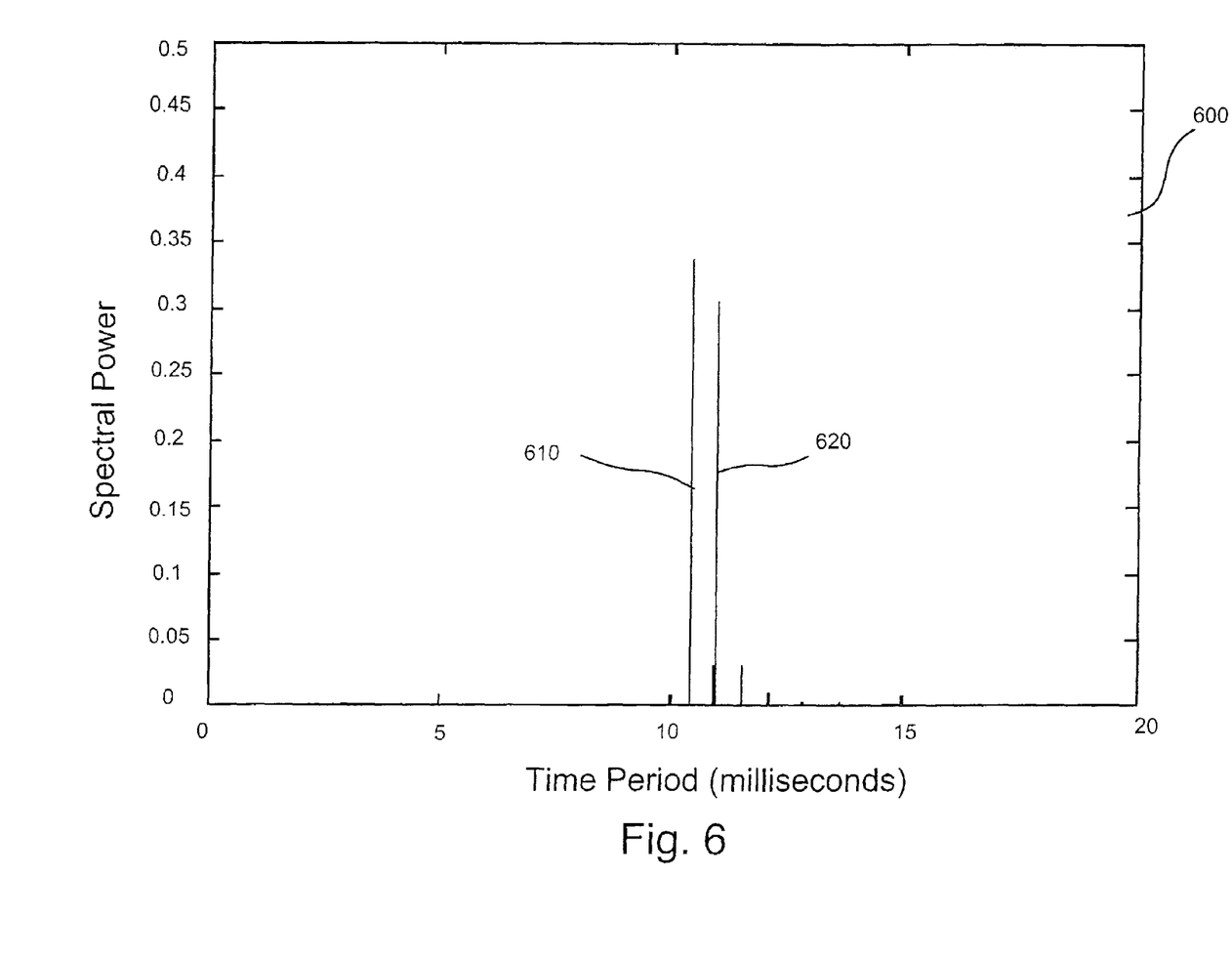
FIG. 6 shows a Lomb periodogram obtained from the simulated network of FIG. 5.

FIG. 6 shows a Lomb periodogram 600 obtained from the simulated network of FIG. 5. Plot 600 shows that even for straightforward +1/−1, non-uniform signal encoding, two prominent peaks 610 and 620 may be identified in the plot. Closer examination reveals that the peaks 610 and 620 are located at 10.41 ms and 10.93 ms, respectively. These two times correspond to the send rates of the two FTP flows 510 and 520. Hence, the Lomb periodogram 600 is able to reveal the presence of the two FTP flows.

Further, even though the tap 120 is on the wire between nodes n2 and n3, and hence did not see a single packet corresponding to the first flow 510 (i.e., n1 to n4), the Lomb periodogram shows the effects of the first flow 510 (i.e., the 10.93 ms transmission interval). This is an example where frequency analysis is useful for detecting "hidden" frequencies or characteristics, which may not be apparent in the time domain.

Wireless Network:

In wireless networks, taps may detect transmissions above a certain signal strength threshold, and may uniquely identify (and tag) each signal reception with its transmitting node. Consequently, a tap may only hear/tap a subset of nodes in the network. Moreover, taps may only detect the lowest level physical transmissions, as opposed to the MAC layer, in such wireless networks.

Figure 7:
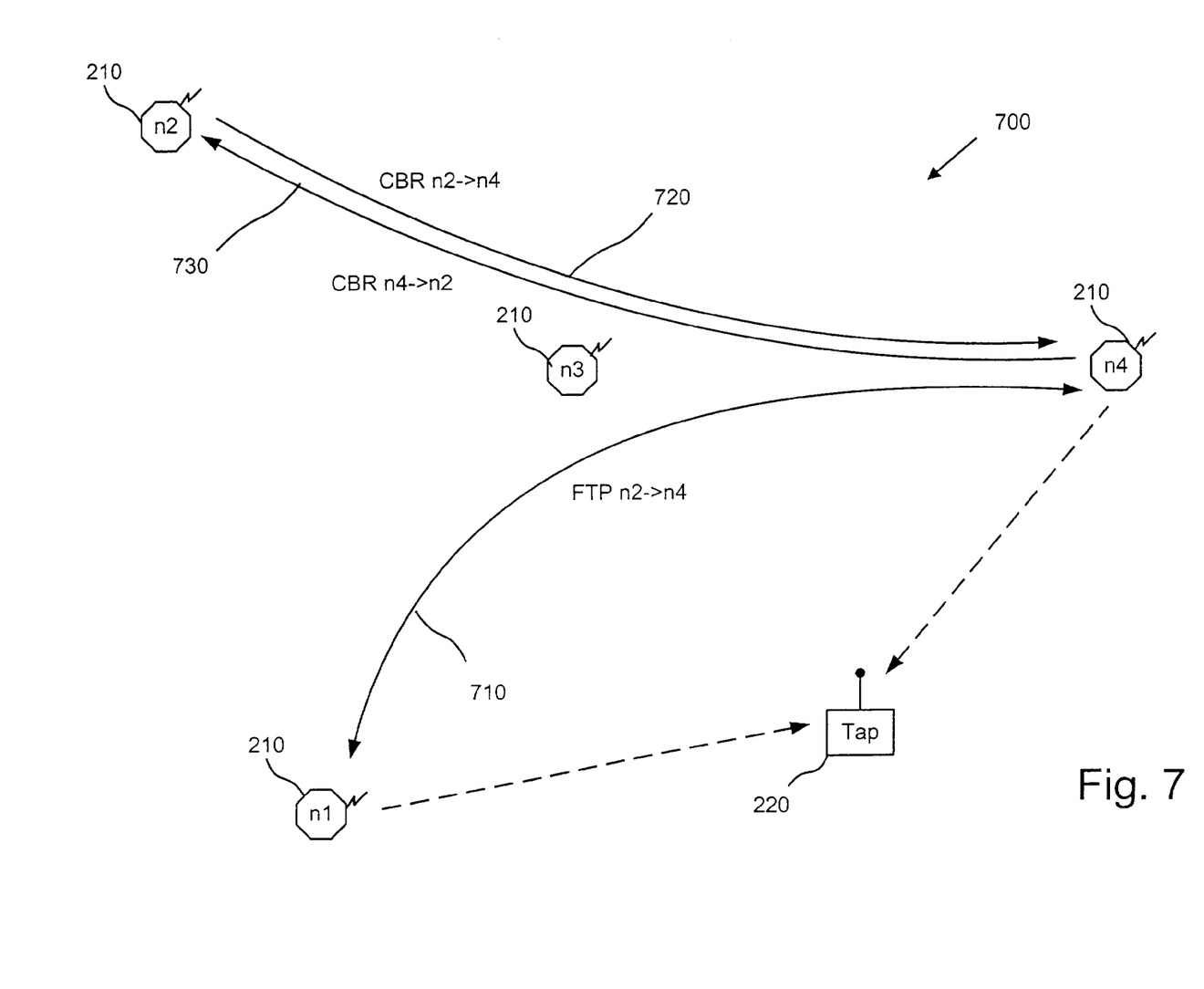
FIG. 7 illustrates a simulated wireless network with which Lomb periodogram simulations were performed.

FIG. 7 illustrates a simulated wireless network 700 that generated a signal on which the Lomb periodogram processing described above was performed. The simulated wireless network 700 included four nodes 210 (i.e., n1-n4). This network was simulated in a simulation program (e.g., ns-2) with an 802.11b MAC layer, and a 2 Mb/s transmission bandwidth. The nodes 210 were deliberately placed in a configuration so that any traffic from nodes n1 or n2 to node n4 has to be routed through node n3, because node n4 is too far away and cannot directly hear nodes n1 and n2. The wireless link between nodes n3 and n4 is, therefore, the bottleneck link. Three flows were set up: an FTP flow 710 from node n1 to n4, a first CBR (constant bit rate) flow 720 from node n2 to n4, and a second CBR flow 730 from node n4 to n2.

Tap 220 is oriented in the network 700 so that it can only detect transmissions from nodes n1 and n4 (denoted by the dotted lines). The tap 220 does not hear any transmission from nodes n2 or n3. Node n2 is too far away for reception, and node n3 is both far away and has low signal strength. A non-uniform signal encoding is created from the tracefile by assigning the amplitude +1 to all receptions from node n1, and −1 to all receptions from node n4.

This simulation was run in a network simulator (e.g., ns-2) for 300 seconds using the Dynamic Source Routing (DSR) protocol to maintain connectivity in the ad hoc network 700. The first CBR flow 720 from n2 to n4 was configured to send packets of 1024 bytes each, at an average transmission rate of one packet every 173 ms. The second CBR flow 730 from n4 to n2 was also configured to send packets of 1024 bytes each, but at a rate of one packet every 75 ms. The statistics for the FTP flow 710 from n1 to n4 were a round trip time (rtt) of 371 ms and a mean deviation (rttvar) of 92.5 ms.

It should be noted that the trace produced by the tap 220 in this wireless network 700 is more complex and noisy than the corresponding trace produced in the wired network 500. For example, the events received at the tap 210 include the DSR routing updates, which do not correspond to any end-to-end flow. Further, due to the nature of the 802.11b protocol, packet transmissions are interspersed with MAC control messages such as the RTS, CTS and MAC layer ACK transmissions. Also, due to the nature of wireless networks, there may be collisions that are resolved at the MAC layer, leading to retransmissions. Finally, there may be interference in the tapped signal from transmissions at node n4 that are not intended for node n1.

Figure 8:
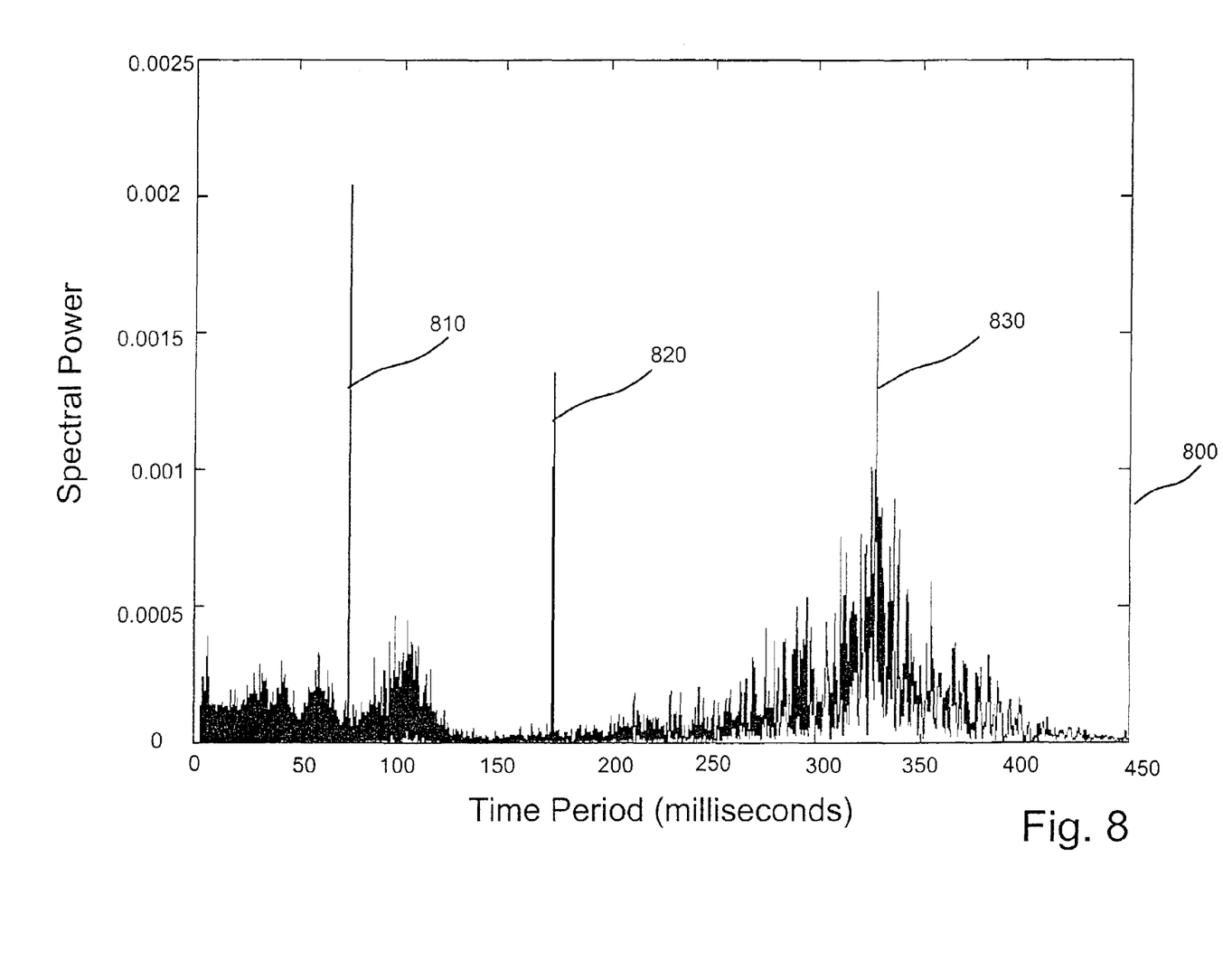
FIG. 8 shows a Lomb periodogram obtained from the simulated network of FIG. 7.

FIG. 8 shows a Lomb periodogram plot 800 obtained from the simulated network of FIG. 7. Lomb periodogram plot 800 shows three more prominent peaks 810-830, which correspond to each of the three flows 710-730. Both the first and second CBR flows 720 and 730 produce peaks very close to their transmission rates. Peaks 810 and 820 are located at 75.01 ms and 173.08 ms, respectively, which reflect transmission intervals of the first CBR flow 720 from node n2 to n4 and the second CBR flow 720 from node n4 to n2 (i.e., 75 ms and 173 ms, respectively).

The FTP flow 710 from node n1 to n4 produces the peak 830 located at 328.85 ms, which corresponds to the round-trip time for this TCP flow. This value is well within the standard deviation (i.e., 92.5 ms) of the measured round-trip time (i.e., 371 ms) for this simulated FTP flow.

Plot 800 shows the effects of both the first and second CBR flows 720 and 730, even though it does not receive any signal from node n2, an end-point for both these flows. That the first CBR flow 720 from node n1 to n4 may be observed in plot 800 is remarkable, because not only can the tap 220 not hear the transmissions of node n2 (or node n3), but also the tap 220 cannot know when node n4 receives a packet. Although the tap 220 does not hear any transmission directly related to this first CBR flow 720, its peak 810 is one of the most prominent peaks.

This example is a good illustration of the Lomb periodogram's utility in extracting useful information for detection of conversations even in complex wireless networks where the trace may be quite noisy (e.g., due to the routing traffic), incomplete (e.g., due to the limited range of taps), and/or complex (e.g., due to an inherently complex MAC layer transmissions). In FIGS. 7 and 8, the Lomb method is able to identify the key timing parameters of the flows, and thus reveal all three IP flows.

Exemplary Flow Classification Processing

Classification of signatures (e.g., as in act 330) is generally understood by those skilled in the signal processing arts. Various techniques are known to classify a certain signature into one or more different classes. Generally, these techniques involve training or otherwise developing a number of known signatures, against which a candidate signature will be compared. Candidate signatures (e.g., those shown in FIGS. 6 and 8) may be compared against a set of known signatures, and probabilities or other measures of "sameness" with various known signatures may be generated. Alternately, binary decisions may be made (i.e., matches or does not) based on a boundary between different signatures in a particular signature-space.

Using a Lomb periodogram (e.g., 600, 800), a signal generated from a tap 120/220 may be used to determine a number of data flows on a wired or wireless network. From the periodicity information in such periodograms, a type of data flow (e.g., FTP, CBR, etc.) may be hypothesized. Such classification of flows may be aided by other knowledge, such as typical transmission periods of different types of flows.

Lomb periodograms may exhibit the dominant frequencies/periods in a signal. One type of such a dominant period is the round-trip time of a signal flow (e.g., in a TCP flow, the time between sending a packet and receiving an acknowledgment of the packet from the destination node). Another type of dominant period may be the latency associated with a data flow. Another type of dominant period may be the application send rates. Certain types of data flows (i.e., applications) may have "characteristic" periods/frequencies associated with them (e.g., voice over IP, video data, sensor data, etc.). These characteristic periods may be inherent in the type of data flow (e.g., a continuous stream of data). To the extent that these characteristic periods/frequencies identify certain applications or types of data flows, these periods may be used as "signatures" of the applications for classification processing. Applications that are not directly observed may still be characterized, because of their influence on other data flows that are observed. Hence, using a minimal amount of information, such as the arrival times of chunks at a tap 120/220, different flows at the tap 120/220 may be detected and classified.

In one implementation consistent with the principles of the invention, time intervals associated with particular network applications (e.g., messaging or data exchange applications) may be derived from the periodic spectral power information in a Lomb periodogram. Such deriving may include, for example, selecting to several strongest periods within a periodogram, determining corresponding time intervals, and associating these intervals with particular network applications. Those skilled in the signal processing art will be able to associate time periods with particular applications based on observation and experience. The time intervals may be used to estimate a physical distance between nodes 110/210 running the network applications. For example, known latencies associated with the network applications may be taken into account to determine a round trip time between the nodes 110/210 running these applications. Those skilled in the signal processing art will appreciate other schemes for computing the distance between nodes 110/210 based on such time intervals associated with particular network applications.

In another implementation consistent with the principles of the invention, time intervals associated with particular network protocols (e.g., FTP, CBR, TCP, etc.) may be derived from the periodic spectral power information in a Lomb periodogram. Such deriving may include, for example, selecting to several strongest periods within a periodogram, determining corresponding time intervals, and associating these intervals with particular network protocols. Those skilled in the signal processing art will be able to associate time periods with particular protocols based on observation and experience. The time intervals may be used to estimate a physical distance between nodes 110/210 running the network protocols. For example, known latencies associated with the network protocols may be taken into account to determine a round trip time between the nodes 110/210 running these protocols. Those skilled in the signal processing art will appreciate other schemes for computing the distance between nodes 110/210 based on such time intervals associated with particular network protocols.

CONCLUSION

Methods and systems consistent with the principles of the invention may use non-uniformly spaced, time of arrival data in a network to obtain periodicity information about data flows in the network. Characteristics of the data flows may be obtained by processing the periodicity information.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

For example, the data processing associated with in FIGS. 4-8 may be performed by a computer program or software instructions executed on a general-purpose processor (not shown). Where expeditious, some instructions may be performed in parallel on multiple processors (e.g., computing different periodograms). The computer program or software instructions may be embodied on a computer-readable medium (e.g., magnetic, optical, semiconductor, etc.) that is readable by a general-purpose processor.

Further, although Lomb processing has been discussed as one way to obtain periodicity information about a signal, other types of signal processing for non-uniform sample data may be used that generate such periodicity information. It is specifically contemplated that these other schemes for generating a power spectral density diagrams of signal power versus frequency or time may be used according to the principles of the invention described herein.

Moreover, the acts in FIG. 3 need not be implemented in the order shown; nor do all of the acts need to be performed. Also, those acts which, are not dependent on other acts may be performed in parallel with the other acts.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of analyzing communication from nodes in a network, comprising:
   obtaining time of arrival information for chunks of data in the network;
   constructing a signal to represent the time of arrival information, the signal consisting of data that is non-uniformly spaced; and
   processing the signal using a Lomb technique to obtain periodicity information about the signal.

2. The method of claim 1, wherein the time of arrival information includes at least one of identification of a node on the network that transmitted the chunk of data, a duration of the chunk of data, and identification of a node on the network that will receive the chunk of data.

3. The method of claim 1, wherein the network is a wireless network.

4. The method of claim 1, wherein the network is a wired network.

5. The method of claim 1, wherein the constructing includes:
   encoding times of arrival as impulses or pulses.

6. The method of claim 5, wherein the encoding includes:
   assigning a sign to the impulses or pulses based on which node sent a chunk received at the time of arrival.

7. The method of claim 1, wherein the processing includes:
   performing Lomb processing on the signal to obtain spectral power information for the signal versus time or frequency.

8. The method of claim 7, further comprising:
   classifying data flow in the network using the spectral power information.

9. The method of claim 8, wherein the classifying further includes:
   determining a number of different data flows in the network based on the spectral power information.

10. The method of claim 8, wherein the classifying further includes:
    determining types of data flows in the network based on the spectral power information.

11. The method of claim 8, wherein the classifying further includes:
    deriving time intervals associated with particular network applications from the spectral power information.

12. The method of claim 11, wherein the classifying further includes:
    estimating a physical distance between nodes running the network applications from the time intervals.

13. The method of claim 8, wherein the classifying further includes:
    deriving time intervals associated with particular network protocols from the spectral power information.

14. The method of claim 13, wherein the classifying further includes:
    estimating a physical distance between nodes employing the network protocols from the time intervals.

15. The method of claim 1, further comprising:
    analyzing data flow in the network using the periodicity information.

16. A method of processing communication signals from nodes in a network, comprising:
    obtaining time of arrival information for chunks of data in the network;
    constructing a signal to represent the time of arrival information, the signal including data that is non-uniformly spaced; and
    processing the signal using a Lomb technique to obtain periodicity information about the signal.

17. The method of claim 16, wherein the constructing includes:
    encoding times of arrival of the chunks as impulses or pulses.

18. The method of claim 17, wherein the encoding includes:
    assigning a sign to the impulses or pulses based on which node sent the chunks.

19. The method of claim 16, wherein the periodicity information includes a power spectrum of the signal.

20. The method of claim 16, further comprising:
    classifying data flow in the network using the periodicity information.

21. The method of claim 20, wherein the classifying further includes:
    determining a number of different data flows in the network based on the periodicity information.

22. The method of claim 20, wherein the classifying further includes:
    determining types of data flows in the network based on the periodicity information.

23. A method of processing communication signals, comprising:
    obtaining time of arrival information for chunks of information in a network;
    generating a signal containing non-uniformly spaced data that represent the times of arrival of chunks of information in the network; and
    processing the signal using a Lomb technique to obtain periodicity information about the signal and to obtain power of the signal versus time or frequency.

24. The method of claim 23, further comprising:
    classifying data flow in the network using the power of the signal.

25. A computer-readable medium that stores instructions executable by one or more processors to perform a method for processing a signal, comprising:

instructions for obtaining time of arrival information for chunks of information in a network;

instructions for generating a signal containing non-uniformly spaced data that represent the times of arrival of chunks of information in the network; and instructions for processing the signal using a Lomb technique to obtain periodicity information about the signal and to obtain power of the signal versus time or frequency.

26. The computer-readable medium of claim 25, wherein the instructions for processing include:

instructions for determining a number of data flows in the network by counting prominent peaks in the power of the signal.

27. A communication tap in a network, comprising:

means for capturing chunks of data in the network;

means for determining time of arrival information for the chunks of data;

means for generating a signal to represent the time of arrival information, the signal consisting of data that is non-uniformly spaced; and means for processing the signal using a Lomb technique to obtain periodicity information about the signal.

28. The communication tap of claim 27, further comprising:

means for analyzing data flow in the network using the periodicity information.

* * * * *